United States Patent
Kinter

(10) Patent No.: US 8,574,119 B1
(45) Date of Patent: Nov. 5, 2013

(54) PINION CARRIER ASSEMBLY

(75) Inventor: William F. Kinter, Plymouth, MI (US)

(73) Assignee: Ford Global Technolgies, LLC, Dearborn, MI (US)

( * ) Notice: Subject to any disclaimer, the term of this patent is extended or adjusted under 35 U.S.C. 154(b) by 0 days.

(21) Appl. No.: 13/561,146

(22) Filed: Jul. 30, 2012

(51) Int. Cl.
*F16H 57/08* (2006.01)

(52) U.S. Cl.
USPC .......................................... 475/331

(58) Field of Classification Search
None
See application file for complete search history.

(56) References Cited

U.S. PATENT DOCUMENTS

| | | | | |
|---|---|---|---|---|
| 3,527,121 A | * | 9/1970 | Moore | 475/338 |
| 5,382,203 A | * | 1/1995 | Bellman et al. | 475/331 |
| 5,658,215 A | * | 8/1997 | Premiski et al. | 475/331 |
| 6,434,827 B1 | * | 8/2002 | Trent et al. | 29/893.1 |
| 6,561,945 B2 | * | 5/2003 | Shattuck et al. | 475/331 |
| 6,609,993 B2 | * | 8/2003 | Ohkubo et al. | 475/331 |
| 7,214,160 B2 | * | 5/2007 | Illerhaus | 475/331 |
| 7,341,539 B2 | * | 3/2008 | Huber et al. | 475/331 |
| 7,556,583 B2 | * | 7/2009 | Wang et al. | 475/331 |
| 7,608,010 B2 | * | 10/2009 | Briscoe | 475/331 |
| RE41,313 E | * | 5/2010 | Simon | 475/340 |
| 8,435,156 B2 | * | 5/2013 | Christ | 475/331 |

* cited by examiner

*Primary Examiner* — Dirk Wright

(74) *Attorney, Agent, or Firm* — James Dottavio; MacMillan, Sobanski & Todd, LLC

(57) ABSTRACT

A pinion carrier includes a shell including a face plate, a lip spaced axially from the face plate, a hub including a plate spaced from face plate and a collar spaced axially from the lip, posts, each post spaced angularly about an axis, secured to the plate and face plate by welds, shafts spaced angularly about the axis, secured to the plate and face plate, and pinions, each pinion supported on one of the shafts.

16 Claims, 3 Drawing Sheets

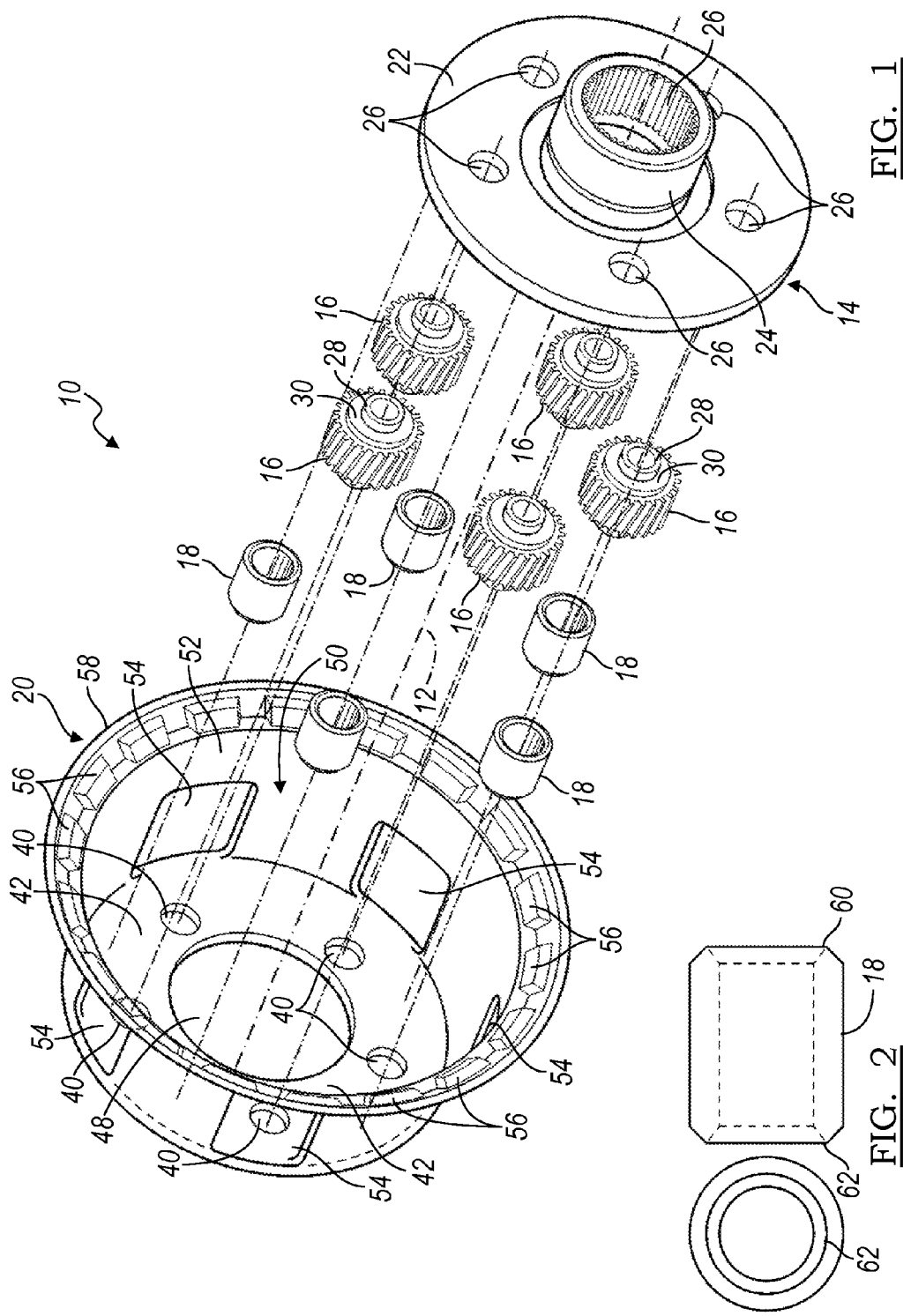

PINION CARRIER ASSEMBLY

BACKGROUND OF THE INVENTION

1. Field of the Invention

This invention relates to a pinion carrier for an automatic transmission, and more particularly to such a carrier having a series of structural support posts welded in place to join a hub and a face plate.

2. Description of the Prior Art

Automatic transmissions for motor vehicles commonly use torque converter couplings with planetary gear units, which produce multiple forward gears and a reverse drive, depending on the design, by simultaneously engaging or locking various control elements of the planetary gear unit.

A simple planetary gear unit includes a sun gear, a ring gear, and a carrier, which supports a plurality of shafts on which are mounted planet pinions. The planetary pinion carrier provides the structure to carry torque through the pinion gears and shafts to an output member, and therefore must be rigid enough to provide gear location without deflection.

SUMMARY OF THE INVENTION

A pinion carrier includes a shell including a face plate, a lip spaced axially from the face plate, a hub including a plate spaced from face plate and a collar spaced axially from the lip, posts, each post spaced angularly about an axis, secured to the plate and face plate by welds, shafts spaced angularly about the axis, secured to the plate and face plate, and pinions, each pinion supported on one of the shafts.

The carrier provides an effective, multiple-piece construction which is very strong and easy to manufacture at a relatively low cost. The carrier also allows design flexibility in the number of pinions that can be accommodated and a wide range of materials that can be used in the hub and the face plate.

The carrier provides simplification in the design and reduced cost of the carrier hub, a carrier assembly that is structurally stiff and strong, without degradation in the function of the carrier.

The shell can be a flow formed or press formed component. The hub can be a cold forging. The assembly requires small axial and radial space.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 1 is a perspective side view of a planetary pinion carrier showing a shell, plate and pinions and spacers arranged angularly about an axis;

FIG. 2 includes an end view and a cross section of one of the posts taken at a diametric plane;

DESCRIPTION OF THE PREFERRED EMBODIMENT

Figure 4:
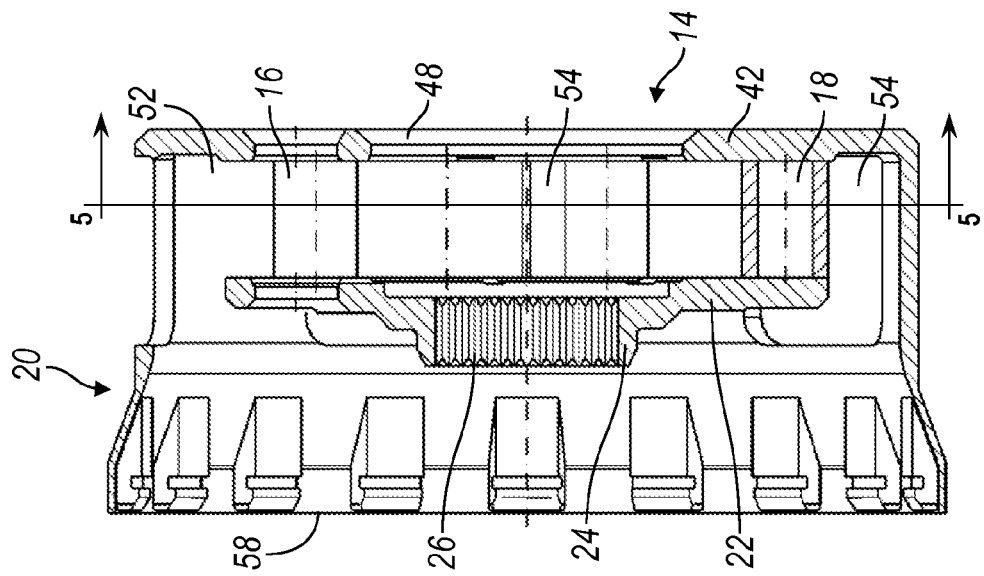
FIG. 4 is a cross section of the carrier assembly taken at diametric plane 4-4 through FIG. 3.
Figure 3:
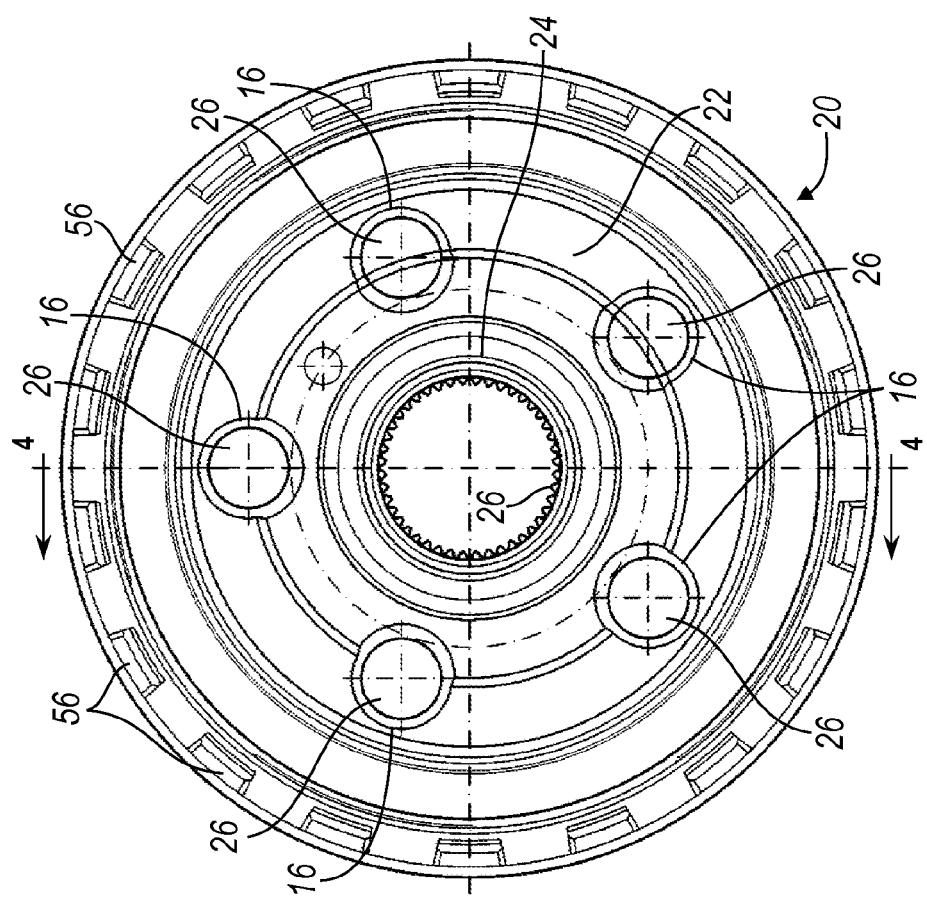
FIG. 3 is an end view of the carrier assembly.
Figure 5:
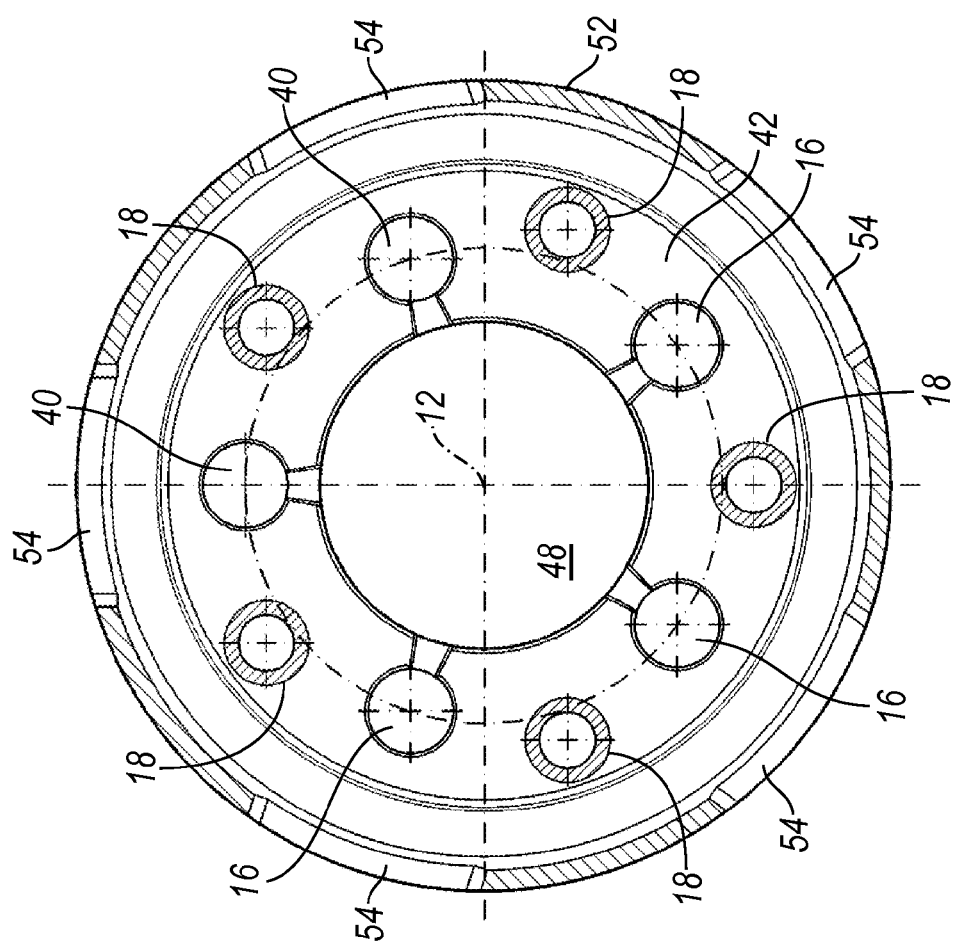
FIG. 5 is a cross section of the carrier assembly taken at diametric plane 5-5 through FIG. 4.

FIG. 1 shows a planetary pinion carrier 10 for an automatic transmission of a motor vehicle. The carrier 10, which is substantially aligned about a central axis, 12 includes a hub 14, planet pinions 16, posts 18, and a shell 20. The hub 14 includes a circular plate 22 and an annular collar 24, which extends axially along axis 12 and away from plate 22. Collar 24 is preferably integrally formed with plate 22 and is formed with axially directed internal spline teeth 26, adapted to mesh with an input or an output shaft.

Plate 22 is formed with a series of holes 26 angularly spaced about axis 12, each hole 26 being sized to receive a pinion shaft 28, which extends axially through one of the pinions 16. As FIG. 4 shows, each planet pinion 16 is supported for rotation on a respective pinion shaft 28, and each pinion shaft is supported on plate 22 and shell 20.

Each pinion shaft 28 extends into one of the holes 26 in plate 22 and into one of the holes 40 formed in the face plate 42 of the shell 20. The face plate 42 is formed with a central opening 48.

In a preferred embodiment carrier 10 accommodates five pinions 16 and five posts 18. Although five pinions 16 are shown in the figures, it should be understood that the carrier 10 can be provided with a sufficient number of holes 26, 40 to accommodate between three and six planet pinions 16.

The end of shell 20 opposite face plate 42 is an open end 50. An outer wall 52 of shell 20 is formed with access openings or apertures 54, each opening located at the angular position of one of the pinions 18, thereby providing access to facilitate installation of the respective pinion in the shell 20. An outwardly extending lip 58 surrounds the open end 50 of drive shell 20. Spline teeth 56, formed on an inner surface of the side wall 52 near the lip 58, are spaced angularly about axis 12.

As shown in FIG. 2 each post 18 is in the form of a hollow cylinder that extends axially between the hub's plate 22 and the shell's face plate 42. A first end 60 of each post 18 contacts the hub plate 22. The opposite end 62 of each post 18 contacts the shell's face plate 42. The cylindrical shape of the hollow cylindrical posts 18 provides a relatively high strength to weight ratio and permits the posts to be positioned for welding without regard for their angular orientation. Each end 60, 62 of each post 18 has a pointed rim formed by cold heading or screw machining, thereby facilitating welding the posts to the plates 22, 42. Preferably the posts 18 are welded to the plates 22, 42 by a capacitive discharge welding process, laser welding or electron beam welding.

Each post 18 is preferably of lower carbon steel, such as 1010 steel. The hub 14 and its plate 22 preferably formed from higher carbon steel, such as 1040 steel. Alternatively, the hub and/or the face plate can be formed from powdered metals.

Plate 22 is rotated with respect to axis 12 such that each hole 26 in plate 22 is aligned with a hole 40 in face plate 42. Each pinion shaft 28 is inserted into one of the holes 26, 40 and the corresponding pinion 16 is installed though one of the openings 54 in the side wall 52 of the shell 20. The pinion shaft is inserted though the pinion 16 and into the other of the holes 26, 40. The pinion shaft 28 is secured to the plates 22, 42 by swaging the ends of the pinion shaft against the surface of the holes 26, 42 in plates 22, 42.

A shaft (not shown) having external spine teeth formed on its outer surface is inserted through the opening 48 of the face plate 42 of drive shell 20, through the collar 24, and into engagement with the internal spline teeth 26. Another member (not shown) engages the spline teeth 56 at the end of lip 58 at the open end 50 of shell 20. In this way, torque can be transferred between the shaft and the member through the pinion carrier 10 and shell 20.

The shell 20 and the hub 14 can be formed by any conventional production method such as stamping, cutting, drawing, cold forming, and flow forming. Preferably the shell 20 is formed by cold flow forming and the hub 14 is formed by cold forging or stamping.

In accordance with the provisions of the patent statutes, the preferred embodiment has been described. However, it should be noted that the alternate embodiments can be practiced otherwise than as specifically illustrated and described.

The invention claimed is:

1. A pinion carrier, comprising:
   a shell including a face plate, a lip spaced axially from the face plate;
   a hub including a plate spaced from the face plate and a collar spaced axially from the lip;
   posts, each post spaced angularly about an axis, secured to the plate and face plate by welds, there being no hole or slot in the plate or face plate at a location of any of the posts; and
   shafts spaced angularly about the axis, secured to the plate and face plate;
   pinions, each pinion supported on one of the shafts.

2. The pinion carrier of claim 1 wherein the collar is formed with internal spline teeth.

3. The pinion carrier of claim 1 wherein each post includes a first end surface contacting the plate and a second end surface contacting the face plate.

4. The pinion carrier of claim 1, wherein:
   the shafts are spaced mutually and angularly about the axis; and
   the posts are spaced mutually and angularly about the axis, such that each post is located at an angular position between angular positions of two of the shafts.

5. The pinion carrier of claim 1 wherein each post is hollow and cylindrical.

6. The pinion carrier of claim 1 wherein a surface of the plate that contacts the posts is substantially planar and a surface of the face plate that contacts the posts is substantially planar.

7. The pinion carrier of claim 1 wherein the shell includes a side wall extending between the face plate and the lip and formed with apertures spaced mutually and angularly about the axis, each aperture located at an angularly location of one of the pinions.

8. The pinion carrier of claim 1 further comprising second spline teeth formed on an inner surface of the shell near the lip, the second spline teeth being spaced mutually and angularly about the axis.

9. A pinion carrier for an automatic transmission, comprising:
   a shell including a first plate;
   a hub located in the shell, including a collar open at opposite axial ends and facing the first plate, and a second plate attached to the collar;
   posts, each post spaced angularly, secured to the plate and face plate by welds, there being no hole or slot in the first plate or second plate at a location of any of the posts; and
   shafts spaced angularly, secured to the plate and face plate;
   pinions, each pinion supported on one of the shafts.

10. The pinion carrier of claim 9 wherein the collar is formed with internal spline teeth.

11. The pinion carrier of claim 9 wherein each post includes a first end surface contacting the first plate and a second end surface contacting the second plate.

12. The pinion carrier of claim 9, wherein:
    the shafts are spaced mutually and angularly about an axis; and
    the posts are spaced mutually and angularly about the axis, such that each post is located at an angular position between angular positions of two of the shafts.

13. The pinion carrier of claim 9 wherein each post is hollow and cylindrical.

14. The pinion carrier of claim 9 wherein a surface of the first plate that contacts the posts is substantially planar and a surface of the second plate that contacts the posts is substantially planar.

15. The pinion carrier of claim 9 wherein the shell includes:
    a lip spaced axially from the first plate;
    a side wall extending between the first plate and the lip and formed with apertures spaced mutually and angularly about the axis, each aperture located at an angular location of one of the pinions.

16. The pinion carrier of claim 15, further comprising second spline teeth formed on an inner surface of the shell near the lip, the second spline teeth being spaced mutually and angularly about the axis.

* * * * *